United States Patent [19]
Thomas et al.

[11] Patent Number: 6,002,257
[45] Date of Patent: Dec. 14, 1999

[54] METHOD AND APPARATUS FOR WELL BORE HOLE-FINDING WITH SIMULTANEOUS BOREHOLE OR FORMATION SENSING

[75] Inventors: Stanley R. Thomas; Gary A. Hazen, both of Houston, Tex.

[73] Assignee: Schlumberger Technology Corporation, Houston, Tex.

[21] Appl. No.: 08/937,710

[22] Filed: Sep. 25, 1997

Related U.S. Application Data

[60] Provisional application No. 60/032,528, Dec. 6, 1996.

[51] Int. Cl.⁶ .............................. G01V 3/18; G01V 3/02
[52] U.S. Cl. ............................. 324/324; 324/355; 702/6
[58] Field of Search .................................. 324/323, 324, 324/347, 354, 357, 355, 366, 358; 73/151, 152, 155; 175/45; 166/250; 340/853.4, 856.1; 33/304; 702/6–9, 11, 12

[56] References Cited

U.S. PATENT DOCUMENTS

| | | |
|---|---|---|
| 4,171,031 | 10/1979 | Marquis . |
| 4,901,804 | 2/1990 | Thometz et al. . |
| 5,210,533 | 5/1993 | Summers et al. . |
| 5,574,371 | 11/1996 | Tabanou et al. . |

FOREIGN PATENT DOCUMENTS 1279105  10/1969  United Kingdom .

*Primary Examiner*—Jay Patidar
*Attorney, Agent, or Firm*—John J. Ryberg; Victor H. Segura

[57] ABSTRACT

A method and apparatus for navigating a tool string down a subsurface borehole to its intended location while simultaneously measuring or sensing the borehole environment, electrically, acoustically, mechanically, or by nuclear means, for a characteristic parameter. The hole-finder apparatus incorporating a locally flexible body adapted for attachment to the tool string. As the tool string is navigated through the borehole, the flexible body provides extreme local flexibility to lessen the likelihood of jamming the tool string while tripping down the borehole by providing a lateral force at the obstruction. The hole-finder apparatus further including a sensor or probe measuring means attached to or within the tip of the flexible body for measuring the characteristic parameter. With the sensor or measurement means disposed at the tip of the apparatus, the sense point is moved to the bottom of the tool string to provide borehole characteristic measurements having little effect on, or momentary influence from, the formation without impeding the apparatus' hole-finding capability. In addition, data representative of the borehole or formation characteristic parameter is communicated from the apparatus to a distant point by wiring.

26 Claims, 5 Drawing Sheets

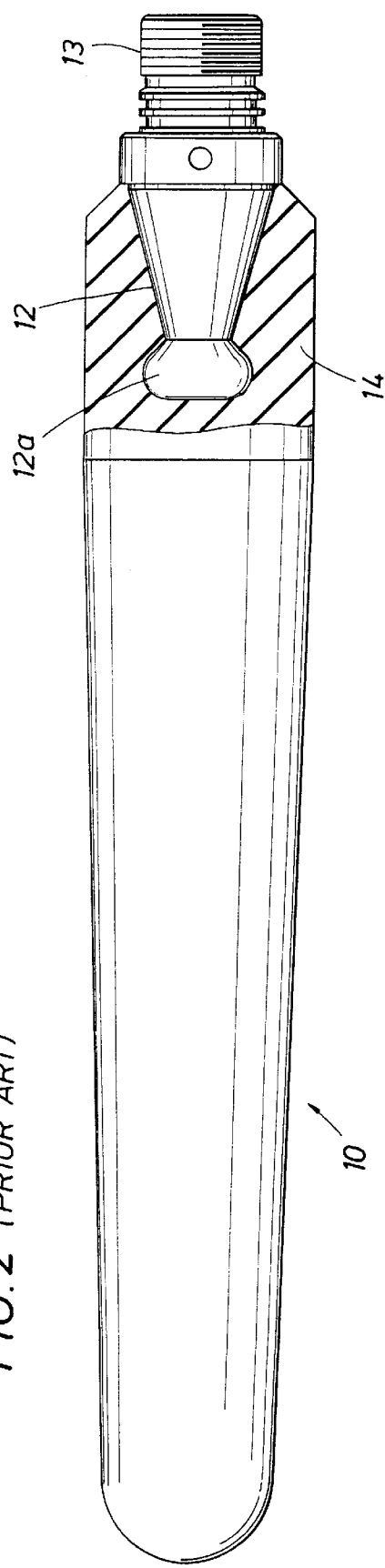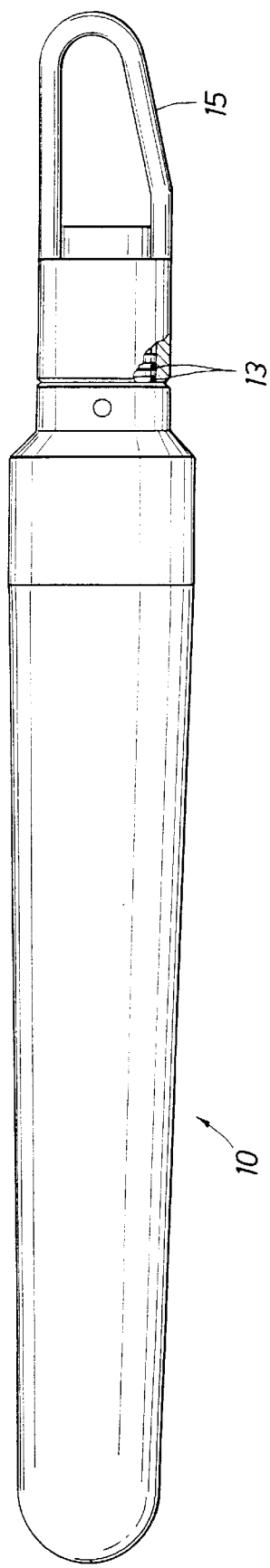
FIG. 2 (PRIOR ART)
FIG. 1 (PRIOR ART)

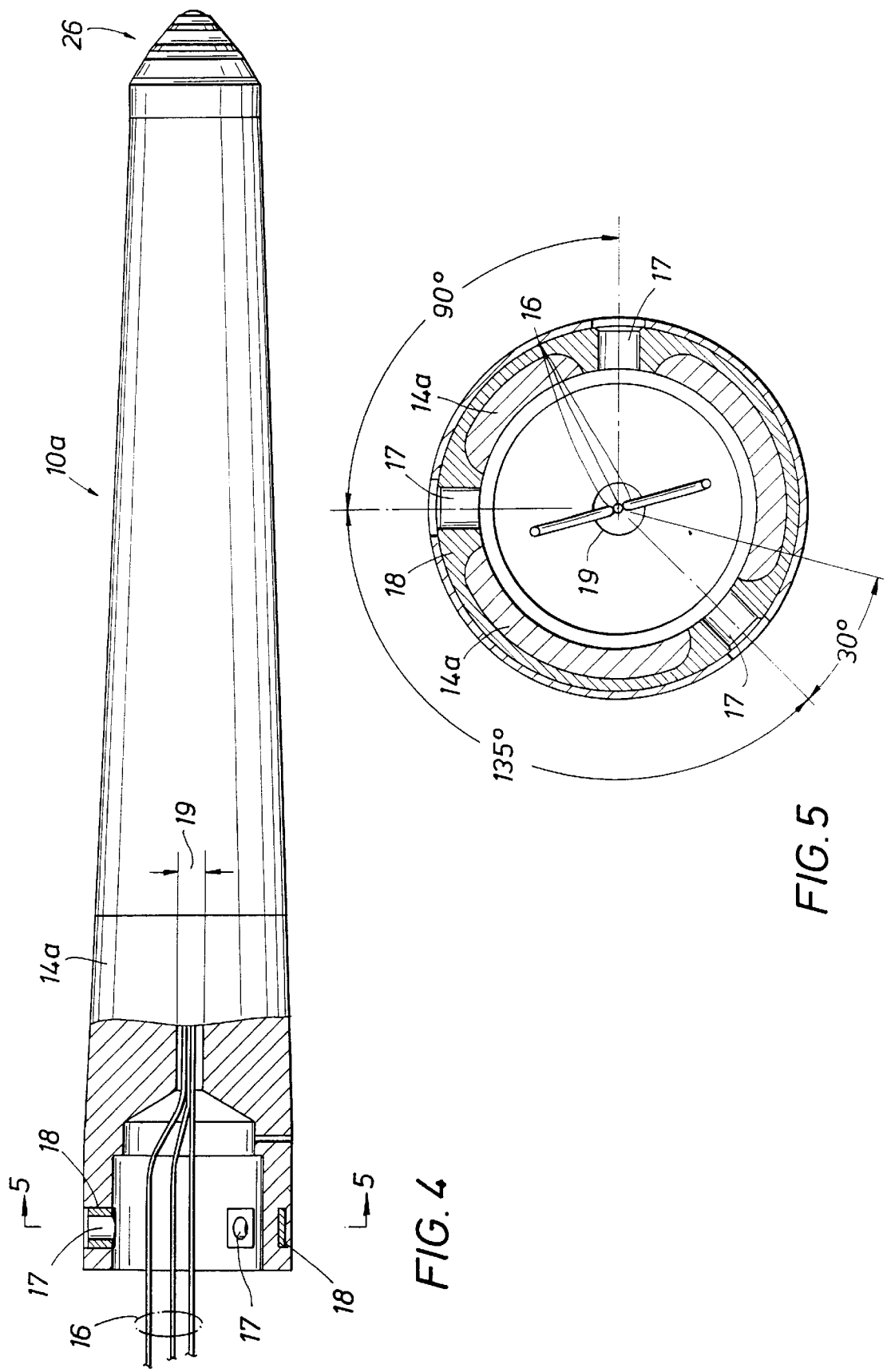

FIG. 6
(PRIOR ART)
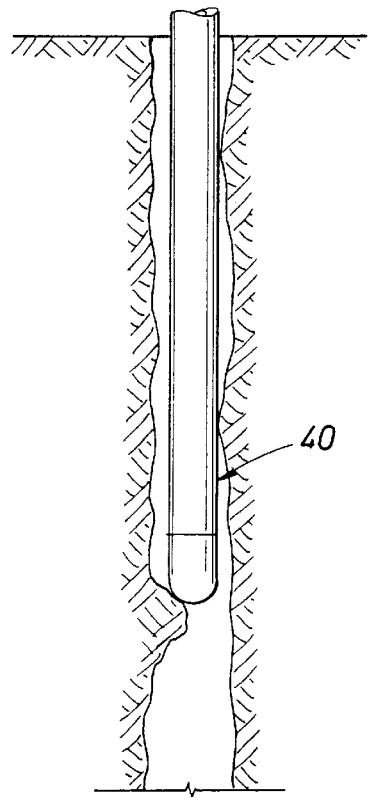
FIG. 7
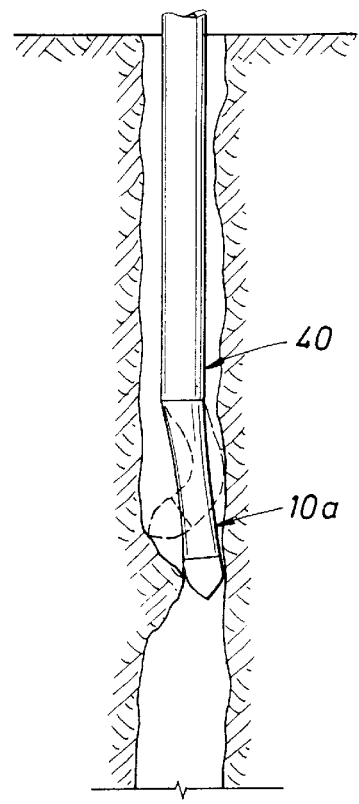
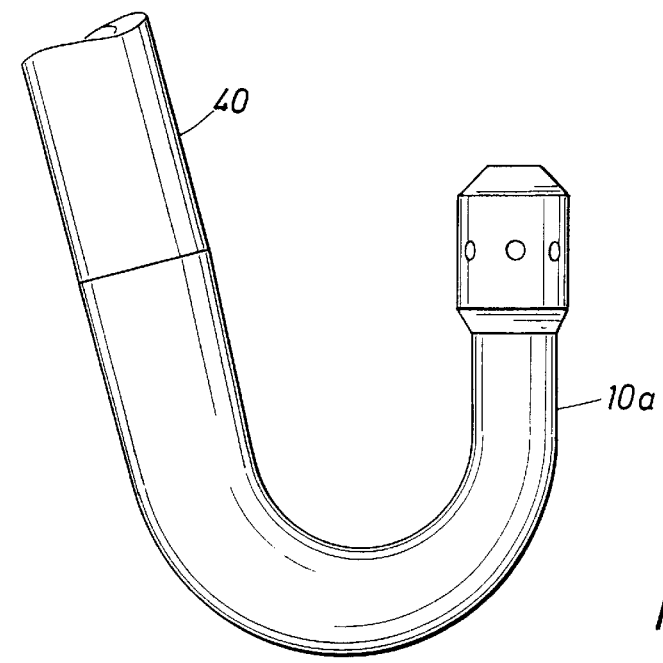
FIG. 8

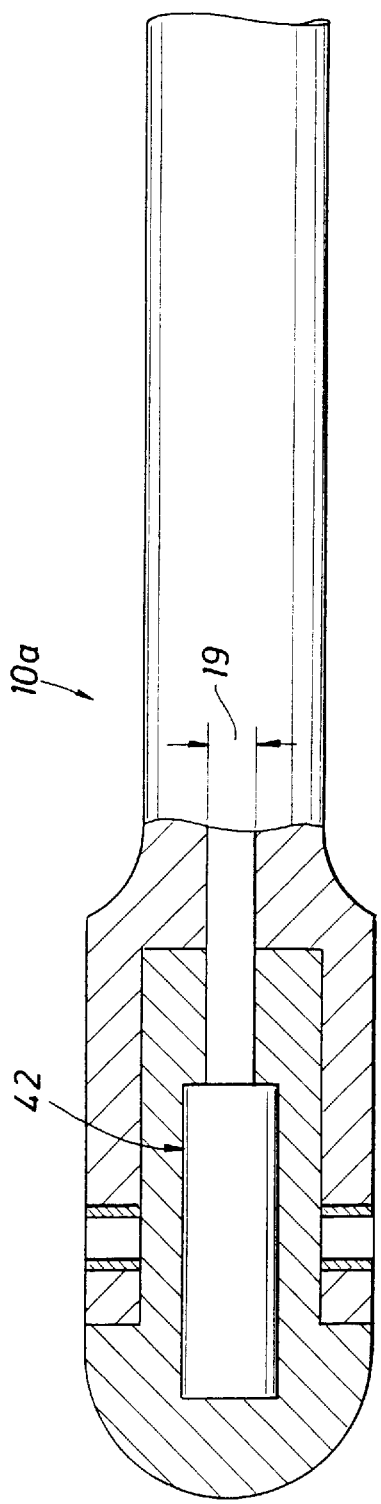
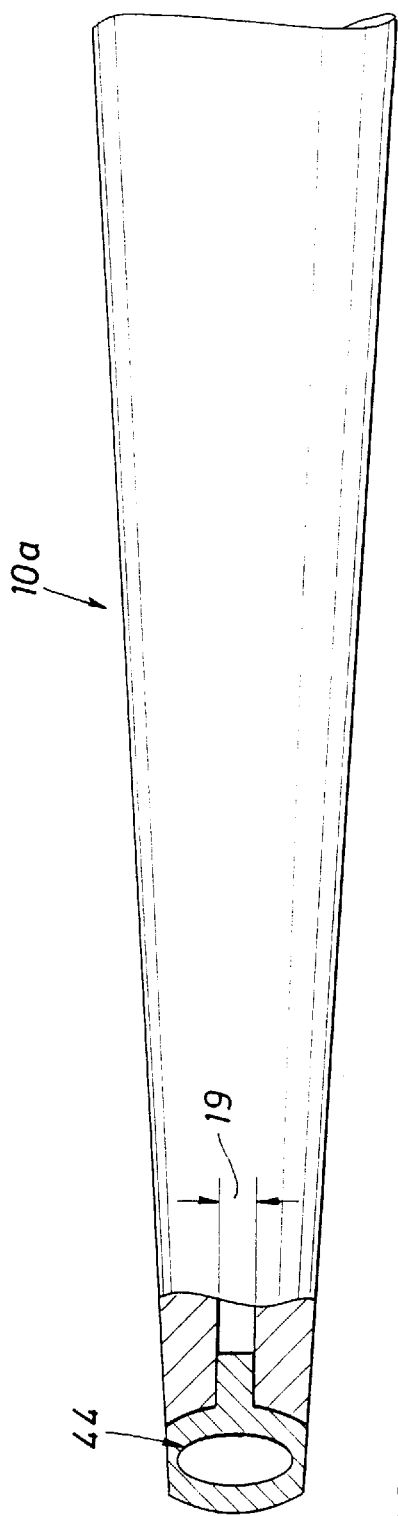

METHOD AND APPARATUS FOR WELL BORE HOLE-FINDING WITH SIMULTANEOUS BOREHOLE OR FORMATION SENSING

This present application claims the benefit of U.S. Provisional Application No. 60/032,528 filed Dec. 6, 1996.

BACKGROUND OF THE INVENTION

1. Field of the Invention

The invention relates to well logging apparatus combined with hole-finding apparatus.

2. Background of the Prior Art

Hole-finding with a transversely flexible device on the bottom of instrumentation or equipment is common in the logistics of downhole measurements. Such a device is characteristically constructed of a homogeneous elastomeric or other similarly flexible material. As shown in FIGS. 1–2, a fundamental form is a slick, tapered profile, uniformly increasing in cross section with proximity to the instrumentation or equipment to provide increasingly stiffer bending moment against lateral flexure toward the tool end. Multiple variations of material choice, cross-sectional profiles, lengths, and applications of protuberances are possible. Regardless of the specifics of the mechanical design of such an apparatus, the objective of the apparatus is to guide a piece of equipment or instrumentation down a subsurface hole to its intended location regardless of the orientation, curvature or size of borehole, or condition, texture or other properties of the borehole wall.

SUMMARY OF THE INVENTION

A method and apparatus are provided for navigating a tool string down a subsurface hole to its intended location regardless of the orientation, curvature, size, or condition of the borehole, while simultaneously measuring or sensing a characteristic parameter of the borehole fluid, formation fluid, or surrounding formation. In one aspect of the invention, an apparatus for navigating a tool string in a borehole and for measuring borehole or formation parameters comprises a flexible member adapted for connection to the bottom of a tool string; and sensing means disposed at one end of the flexible member for measuring borehole or formation characteristics. In a second aspect, a method comprises integrating a measuring means into an end of a flexible member; attaching the flexible member to the bottom of a tool string; inserting the tool string and attached flexible member into a borehole; providing means for communicating between the measuring means and the tool string; acquiring data relating to a characteristic parameter of the borehole or formation; and communicating the data relating to the characteristic parameter of the borehole or formation to a point distant from the flexible member.

One such embodiment is a tool which integrates a series of electrodes as a probe on the tip of the hole-finding apparatus such that the hole-finder can measure borehole fluid resistivity $R_m$ and spontaneous potential $S_p$ as it guides the equipment through the borehole. Orientation and position of the electrodes with respect to each other and the surrounding environment is germane to the design. Extensive modeling has shown that the electrode arrangement used herein as an illustratiave and preferred embodiment has a superior measurement quality, minimizing borehole size and proximity effects.

BRIEF DESCRIPTION OF THE DRAWINGS

FIG. 1 is a view of a prior art hole-finding apparatus having a thread protector attached.

FIG. 2 is a view of the prior art hole-finding apparatus of FIG. 1 (with the thread protector removed), partly in cross-section to show the means for attaching the hole-finder to a logging tool.

FIG. 4 is a view of the present invention with the probe electrode sensors of FIG. 3 integrated into the bottom end of the hole-finder apparatus.

FIG. 5 is a cross-section view of the present invention taken along the line 5—5 of FIG. 4.

FIG. 6 illustrates a conventional well logging tool string disposed in a well bore.

FIG. 7 illustrates the present invention attached to the tool string of FIG. 6.

FIG. 8 illustrates an embodiment of the present invention displaying extreme local flexibility.

FIG. 9 illustrates an alternate sensor means disposed at one end of the present invention.

FIG. 10 illustrates another alternate sensor means disposed at one end of the present invention.

DESCRIPTION OF THE PREFERRED EMBODIMENTS

Figure 3:
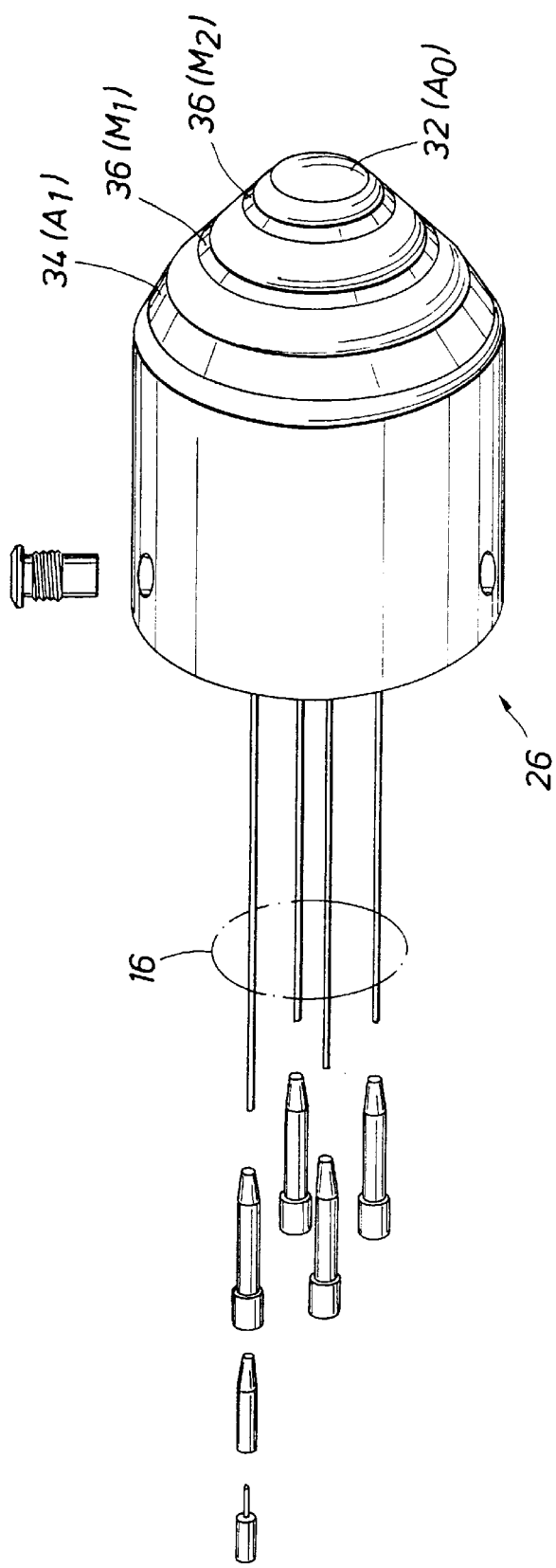
FIG. 3 is a view of a prior-art probe containing electrode sensors.

U.S. Pat. No. 5,574,371 to Tabanou et al describes a probe, shown in FIG. 3, that can be integrated into the end of the hole-finding apparatus. This patent disclosure is incorporated by reference into this disclosure. The measurement probe 26 is securely connected and bonded into the bottom (i.e., end) of the hole-finder as shown in FIG. 4. (For ease of description, the reference designators used herein for the probe 26 of FIGS. 3–5 are the same as those used in FIG. 5 of the '371 patent). The measurement probe 26 is adapted for measuring the spontaneous potential $S_p$ and the resistivity $R_m$ of a mud in the mud-filled borehole. The measurement probe includes a bottom electrode 32 ($A_0$) disposed on a bottom of the probe 26 when the logging apparatus is disposed in a borehole, a second electrode 34 ($A_1$) for measuring spontaneous potential $S_p$ and at least one measurement electrode 36 ($M_1$, $M_2$) disposed adjacent the bottom electrode 32 ($A_0$) for measuring a voltage potential drop in a region of the mud which is disposed directly adjacent and below the bottom electrode 32 ($A_0$) of the measurement probe 26. When the measurement probe 26 is energized, a current flows in the mud between bottom electrode 32 ($A_0$) and the second electrode 34 ($A_1$). The current is initially emitted into the mud from the bottom electrode 32 ($A_0$) and flows in a direction which is approximately parallel to a longitudinal axis of the logging apparatus tool string. Since the measurement electrode 36 ($M_1$, $M_2$) is disposed adjacent the bottom electrode 32 ($A_0$), the measurement electrode 36 ($M_1$, $M_2$) measures the voltage potential drop, i.e., correlating to resistivity, $R_m$, in the region of the mud disposed directly below the bottom electrode 32 ($A_0$). In addition, the voltage potential drop in such region measured by the measurement electrode 36 ($M_1$, $M_2$) is controlled by the current being emitted from, or received in, the bottom electrode 32 ($A_0$) and flowing in such region.

Since the current being initially emitted from, and received in, the bottom electrode 32 ($A_0$) of the measurement probe 26 propagates in the mud in a direction which is approximately parallel to a longitudinal axis of the probe 26, only a very small quantity of such current crosses an interface between the mud in the borehole and a formation penetrated by the borehole. As a result, the voltage potential drop being measured by the measurement electrode 36 ($M_1$, $M_2$) is controlled primarily by the potential drop which exists in the region of the mud disposed adjacent and directly below the bottom electrode 32 ($A_0$). Therefore, even though a large contrast in resistivity may exist at an interface between the conductive mud in the borehole and the formation penetrated by the borehole, since most of the current received in and emitted from the bottom electrode 32 ($A_0$) fails to cross such interface, that resistivity contrast fails to adversely affect the accuracy of the measurement of the mud resistivity $R_m$ taken by the measurement probe 26. The spontaneous potential measurement, $S_p$, can be made from any of the electrodes. In this illustrative example, the upper electrode has been chosen due to its size and proximity to the borehole. The $S_p$ measurement is well known and consists of measuring the DC voltage downhole with respect to an electrode at the surface. This measurement is used for delineating permeable beds, estimating shale content, determining formation water resistivity, and correlation. It is very advantageous to have this measurement near the bottom extremity of the surveying instrument due to its fundamental importance and wide usage.

FIGS. 1 and 2 show views of a prior art hole finder 10, partly in cross-section. In these figures, an attachment piece 12 (known as a threaded field joint) having threads 13 connects the hole-finder 10 to the bottom of a logging tool (not shown). A material 14, such as rubber, forms the body of the hole-finder and engages the attachment piece 12 by means of internal geometry (such as shown at 12a of FIG. 2) which is conducive to supporting a metal-to-rubber bond. A thread protector 15 protects the threads 13 during transportation (i.e., non-use) and also serves as a carrying handle. However, with this configuration, a probe (e.g., such as 26 in FIG. 3) could not be located at the bottom of the hole-finder 10 of FIGS. 1 and 2 because such a design does not provide a ready means to communicate with such a probe. The capability of this tool would be limited to the hole-finding function only, and would not provide any borehole characteristic measuring function.

FIGS. 4 and 5 show an implementation of the present invention shown generally at 10a. A probe such as 26 in FIG. 3 is attached to the end of the hole-finder/probe 10a. Electrical wires 16 pass through a passageway 19 molded or drilled through the hole-finder/probe 10a. If attachment to the drill string is to be made by means of an attachment piece such as 12 in FIG. 2, i.e., by a threaded field joint, the piece 12 must be modified by extending the passageway 19 therethrough to provide for communication between the probe 26 electrodes and other measurement equipment located either in the logging tool or at ground level. In the embodiment of FIGS. 4 and 5, the hole-finder/probe 10a is attached directly to the drill string by means of bolts or set-screws (not shown) through bolt holes 17 in the insert 18 and communication is made possible by wires 16 through the passageway 19 in the hole-finder/probe 10a. As previously stated, the hole-finder/probe 10a guides the tool through the borehole and around obstructions and borehole curvatures while the probe 26 makes measurements of borehole or formation environment characteristics, i.e., resistivity $R_m$ and spontaneous potential $S_p$ in this illustrative example. The hole-finder/probe 10a is made of a flexible material 14a, e.g., an elastomeric material such as 90 duro nitrile rubber. Another preferred material is neoprene 80–85 Shore "A" (Maloney Compound 330-R supplied by Maloney Technical Products, S&B Technical Products of Fort Worth, Tex.). It will be appreciated that the hole-finder can be constructed of other polymers, springs, composites of such, or with other physical materials which provide changing stiffness to lateral forces.

FIG. 5 is a cross-section view of the hole-finder/probe 10a taken along the line 5—5 of FIG. 4. This view is on a section taken through the bolt-holes 17 which receive bolts or set screws (not shown) used to attach the hole-finder/probe 10a to the logging tool (not shown). The bolt holes 17 are made through an insert 18 imbedded in the flexible material 14a, the insert 18 being preferably made of low-carbon steel.

FIG. 6 shows a conventional well logging tool string 40 encountering an obstruction as the string 40 traverses down a borehole. Though most tool strings 40 allow for some flexibility given their slenderness, they are not capable of extreme local flexibility. As shown in FIG. 6, a tool string 40 is prone to jamming as it encounters poor borehole conditions.

FIG. 7 shows the tool string 40 of FIG. 6 with an embodiment of the hole-finder/probe 10a attached to its end. As illustrated in FIG. 7, the hole-finder/probe 10a provides extreme local flexibility, bending and overcoming borehole obstructions to navigate the tool string 40 to the desired location while simultaneously measuring borehole or formation characteristics. FIG. 8 shows an embodiment of the hole-finder/probe 10a displaying the extreme local flexibility provided by the invention.

FIG. 9 shows an embodiment of the hole-finder/probe 10a incorporating a nuclear or acoustic type sensor 42. FIG. 10 shows another embodiment of the hole-finder/probe 10a incorporating a mechanical type sensor 44. It will be appreciated that these and other alternative sensor types may be implemented with the present invention by those skilled in the art having the benefit of this disclosure.

Different physical constructions of this described hole-finder/probe are possible, and it is not intended to be limited to any particular combination of manufacturing process/technique, or sequences of processes/techniques in its construction.

The present invention provides significant advantages over the prior art, namely, it provides borehole characteristic measurements having little effect on, or influence from, the formation while providing the hole-finding capability to assist in navigating the tool down a borehole. Additionally, the sense point for the spontaneous potential $S_p$ measurement is moved to the bottom of the sensing instrument, thus allowing formation measurements to be made at the bottom of the borehole.

The invention has been described in connection with the preferred embodiments of spontaneous potential $S_p$ and mud resistivity measurement $R_m$ apparatus as shown in this illustrative embodiment. However, it will be appreciated that the invention is not limited solely to these measurements but can be expanded to measuring other borehole or formation characteristics with instruments of the aforementioned electrical, acoustic, mechanical or nuclear type, for example. Changes, variations and modifications to the basic design may be made without departing from the inventive concept in this invention. In addition, these changes, variations and modifications would be obvious to those skilled in the art having the benefit of the foregoing teachings contained in this application. All such changes, variations and modifications are intended to be within the scope of the invention which is limited by the following claims.

We claim:

1. An apparatus adapted to be connected to the bottom of a tool string in a borehole, drilled through an earth formation, for navigating said tool string in said borehole and for measuring a borehole or formation parameter, comprising:

a flexible member attached to the bottom of said tool string for navigating said tool string in said borehole, said flexible member having a bottom surface extending into said borehole below said tool string; and a measuring means included in said bottom of said flexible member for measuring a borehole or formation characteristic.

2. The apparatus of claim 1 further including:

means for acquiring information relating to said borehole or formation characteristic and for communicating said information to a point distant from said apparatus.

3. The apparatus of claim 1 wherein said borehole or formation characteristic is resistivity.

4. The apparatus of claim 1 wherein said borehole or formation characteristic is spontaneous potential.

5. The apparatus of claim 1 wherein said borehole or formation characteristic is detected by a radiation sensor located within said flexible member.

6. The apparatus of claim 1 wherein said borehole or formation characteristic is detected by an acoustic sensor located within said flexible member.

7. The apparatus of claim 1 wherein said borehole or formation characteristic is detected by mechanical means.

8. The apparatus of claim 1 wherein said flexible member is tapered toward said bottom surface of said flexible member and wherein said flexibility of said flexible member increases toward said bottom of said flexible member.

9. The apparatus of claim 1 wherein said flexible member is made of an elastomeric material.

10. The apparatus of claim 9 wherein said elastomeric material is rubber.

11. The apparatus of claim 10 wherein said rubber is 90 duro nitrile.

12. The apparatus of claim 9 wherein said elastomeric material is neoprene.

13. The apparatus of claim 1 wherein said measuring means comprises:

a first plurality of surfaces included in said bottom surface of said flexible member, said plurality of surfaces being occupied by an electrode adapted to measure a borehole or formation characteristic; and a second plurality of surfaces included in said bottom surface of said flexible member, said second plurality of surfaces not being occupied by electrodes and providing separation between said electrodes.

14. The apparatus of claim 13 wherein a bottom electrode occupying one of said first plurality of surfaces is adapted to emit a first current into said borehole and a second electrode occupying another of said first plurality of surfaces is adapted to receive said first current from said borehole and wherein said second electrode is adapted for emitting a second current into said borehole and said bottom electrode is adapted to receive said second current from said borehole.

15. The apparatus of claim 14 further comprising at least one measurement electrode occupying still another of said first plurality of surfaces and having a measurement electrode adjacent said bottom electrode and said borehole adapted for measuring a voltage potential in said borehole, said voltage potential being determined by said current flowing in said borehole.

16. The apparatus of claim 15 wherein said first plurality of surfaces including said bottom electrode surface, said second electrode surface and said measurement electrode are joined together with said second plurality of surfaces to form one substantially continuous bottom surface.

17. The apparatus of claim 15 further comprising a second measurement electrode occupying still another of said first plurality of surfaces and having a second measurement electrode surface and disposed adjacent said one measurement electrode adapted for measuring said voltage potential in said borehole, said first plurality of surfaces joining together with said second plurality of surfaces to form one continuous measurement electrode surface.

18. The apparatus of claim 14 wherein substantially all of said first current propagates in a direction which is approximately parallel to a longitudinal axis of said apparatus when said first current is initially emitted from said bottom electrode.

19. The apparatus of claim 14 wherein substantially all of said second current propagates in a direction which is approximately parallel to the longitudinal axis of said apparatus when said second current is received in said bottom electrode.

20. A method for navigating a tool string through a borehole drilled through an earth formation and measuring a characteristic parameter of said borehole or formation, comprising the steps of:

integrating a measuring means into the bottom end of a flexible member, said measuring means being adapted to measure a characteristic parameter of said borehole or formation;

attaching said flexible member to the bottom end of a tool string;

inserting said tool string and said attached flexible member into said borehole;

providing means for communicating between said measuring means and said tool string;

acquiring data relating to said characteristic parameter of said borehole or formation; and communicating said data relating to said characteristic parameter of said borehole or formation to a point distant from said flexible member.

21. In a hole-finder apparatus used for guiding a piece of equipment or instrumentation down a subsurface hole, drilled through an earth formation, to its intended location regardless of the orientation, curvature or size of the hole, or condition, texture or other properties of the hole, having a flexible body and adapted for attachment to the equipment or instrumentation, the improvement comprising:

sensing means disposed at one end of the flexible body for acquiring information relating to the hole or formation characteristic and for communicating the information to a point distant from the apparatus.

22. The improved apparatus of claim 21 wherein the hole or formation characteristic is one of spontaneous potential or resistivity.

23. The improved apparatus of claim 21 wherein the apparatus is attached to the equipment or instrumentation by one of a field joint or fastener means.

24. The improved apparatus of claim 21 wherein the sensing means comprises one of a nuclear sensor or acoustic sensor or mechanical sensor or electrical sensor.

25. The improved apparatus of claim 21 further comprising a passageway extending through the flexible body and adapted to pass a wire therein.

26. The improved apparatus of claim 25 wherein the information relating to the hole or formation characteristic is communicated from the apparatus to the point distant from the apparatus by the wire.

* * * * *